United States Patent [19]

Jones

[11] Patent Number: 4,974,545
[45] Date of Patent: Dec. 4, 1990

[54] ORNAMENTAL ASSEMBLY FOR USE IN AQUARIUMS OR THE LIKE

[76] Inventor: Richard L. Jones, 7989 Lakeshore, Lexington, Mich. 48450

[21] Appl. No.: 325,219

[22] Filed: Mar. 17, 1989

[51] Int. Cl.⁵ ............................................ A01K 63/00
[52] U.S. Cl. ........................................ 119/5; D30/106
[58] Field of Search ................ 119/3, 4, 5; 248/205.5, 248/205.6, 205.7, 205.8, 205.9, 206.1, 206.2, 206.3, 264.4; 40/597; D30/106

[56] References Cited

U.S. PATENT DOCUMENTS

| | | | |
|---|---|---|---|
| 2,908,519 | 10/1959 | Holden | 248/206.3 |
| 3,095,852 | 7/1963 | Goldman | 119/3 |
| 3,512,503 | 5/1970 | Willinger | 119/5 |
| 3,742,912 | 7/1973 | Chen et al. | 119/5 |
| 3,744,454 | 7/1973 | Willinger et al. | 119/5 |
| 4,441,453 | 4/1984 | McMickle | 119/3 |
| 4,708,089 | 11/1987 | Goldman et al. | D30/106 |
| 4,709,657 | 12/1987 | Gothard | 119/5 |
| 4,820,556 | 4/1989 | Goldman et al. | 119/5 |

*Primary Examiner*—John Weiss
*Attorney, Agent, or Firm*—Harness, Dickey & Pierce

[57] ABSTRACT

An ornamental device for use in fluid-filled viewing tanks for enhancing the aesthetic nature of the tank. The ornamental device having a decorative body member and an affixed retaining member for semi-permanently securing the ornamental device to an inner surface of the viewing tank.

9 Claims, 1 Drawing Sheet

ORNAMENTAL ASSEMBLY FOR USE IN AQUARIUMS OR THE LIKE

BACKGROUND AND SUMMARY OF THE INVENTION

The present invention relates generally to ornamental implements for use in viewing tanks and, more particularly, to driftwood and artificial foliage implements for use in aquatic tanks.

Viewing tanks are used to confine various types of natural life forms for the enjoyment of the viewer. Most commonly, fish, small reptiles, rodents and the like are maintained in such viewing tanks. Typically, viewing tanks are equipped with ornate articles and implements such as artifical foliage, pieces of driftwood, sunken ships and other decorative devices which provide an aesthetically pleasing environment.

Generally, the ornate articles and implements which are commercially available for use in viewing tanks are provided with weighted base members. The weighted base member counteracts the buoyancy of the water in aquatic tanks and prevents accidental tipping of the implement in non-aquatic tanks. The base members must be sufficiently weighted to prevent such undesirable tipping or floatation of the ornamental articles within the tank.

Alternatively, other commercially available ornamental devices are provided with base members having a relatively large peripheral area which must be covered by gravel or sand provided at the bottom of the viewing tank. The weight of the gravel or sand maintains the decorative devices at the bottom of the viewing tank. Installation of such decorative devices is restricted to the bottom surface fo viewing tanks and, as such, the ability to freely orient and position such decorative devices within a tank is severely limited.

Because ornate implements are aesthetic accessories which are not permanently attached to an inner surface of the viewing tank, it is not unusual for unanticipated tipping or movement to occur. This undesirable movement is aggravated by the normal activity of the fish, or other life forms confined within the viewing tank. Therefore, it is very desirable to provide means for permitting semi-permanent or removable attachment of the decorative devices within the viewing tank which prevents undesirable tipping and movement. The novelty of the present invention is its functional utility as a decorative viewing tank implement which is capable of being semi-permanently secured to any surface within the viewing tank without the requirement of base weighting or the use of sand or gravel.

Accordingly, it is a primary object of the present invention to provide an aesthetically pleasing ornamental implement for use in viewing tanks, and a method of use, which prevents undesired tipping, movement, or floatation of the ornamental implement.

Another object of the present invention is to provide an ornamental implement which is semi-permanently and removably fixably securable to either the side or bottom surfaces of a viewing tank without the necessity of base weights, sand or gravel.

Yet another object of the present invention is to provide an improved ornamental implement, such as a piece of drifwood, capable of omni-positional movement so as to provide superior viewing tank aesthetics while maintaining a semi-permanent fixed association with any of the inner surfaces of the viewing tank.

Another object of the present invention provides an ornamental viewing tank implement or assembly which is very inexpensive, easy to use, and which is aesthetically pleasing.

Various advantages of the present invention will become apparent to one skilled in the art upon reading the following specification and drawings.

DESCRIPTION OF THE PREFERRED EMBODIMENTS

Figure 1:
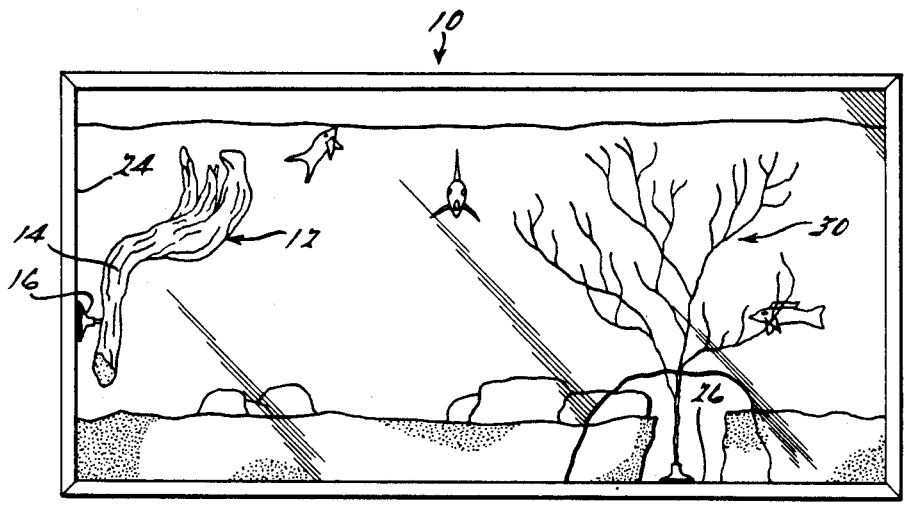
FIG. 1 is a pictorial representation of an ornament driftwood assembly and an artificial foliage implement used in an aquatic viewing tank according to the preferred embodiment of the persent invention.

Referring to FIG. 1, a viewing tank 10 is depicted as an aquatic fish tank according to the preferred embodiment of the present invention. It is contemptated, however, that the principals embodied in the present invention are applicable to non-aquatic viewing tanks for life forms such as reptiles, turtles, mice and the like.

Figure 2:
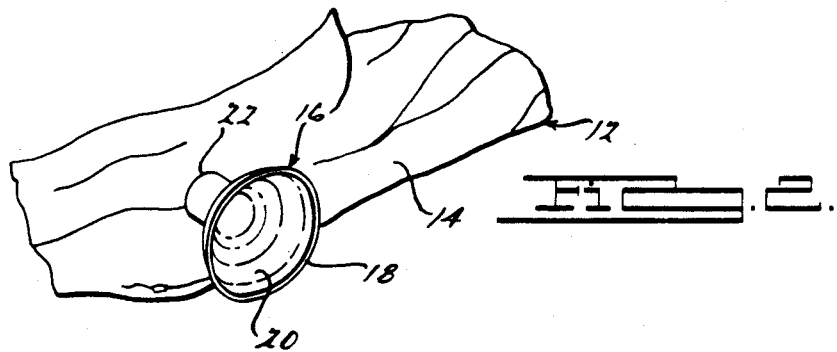
FIG. 2 is an enlarged pictorial view of a section of the ornamental driftwood assembly shown in FIG. 1, illustrating the components in more detail.

Referring to FIGS. 1 and 2, the aquatic viewing tank 10 is shown as having decorative articles including an ornamental driftwood assembly 12 contained within the inner area thereof. Specifically driftwood assembly 12 comprises a body member 14 consisting of a piece of driftwood and a suction member 16. Suction member 16 is permanently affixed to driftwood body member 14. Suction member 16 includes a first end 18 which defines a suction producing surface, preferably configured to be a suction cup 20. A second end 22 of suction member 16 includes means for permanently affixing suction member 16 to decorative driftwood body member 14. Preferably the suction member 16 is mechanically attached to the driftwood body member 14 via a tack, screw or other like means.

Figure 3:
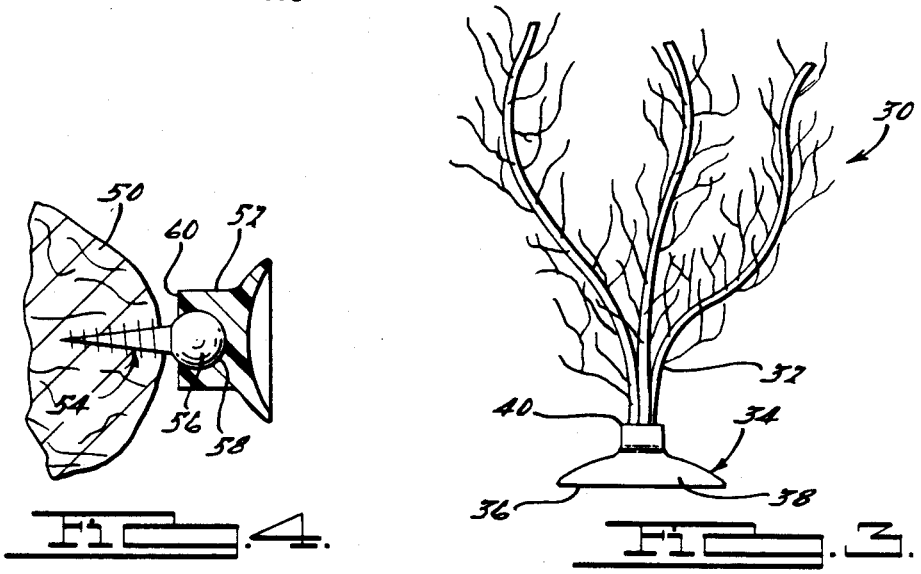
FIG. 3 is a pictorial representation of an ornamental implement consisting of artificial foliage similar to that shown broken away in FIG. 1.

Referring now to FIGS. 1 and 3, the aquatic viewing tank 10 is shown as also including a second ornamental device according to the preferred embodiment of the present invention. Specifically, an ornamental foliage implement 30 is shown as having a foliage body member 32 and a suction member 34. Preferably, the foliage body member 32 is fabricated from plastic. Suction member 34 has a first end 36 configured as a suction cup 38 and a second end 40 configured as a socket to permit permanent attachment of body member 32 therein.

According to the present invention, suction member 16 may be permanently affixed to driftwood body member 14 in numerous orientations. Specifically, second end 22 of suction member 16 can be affixed coaxially with, or substantially perpendicular to, driftwood body member 14. Likewise, similar variations are available for permanently affixing suction member 34 to foliage body member 32 so as to define artificial foliage implement 30. Preferably, foliage body member 32 is secured in generally axial orientation relative to suction member 34 as shown in FIGS. 1 and 3.

In accordance with this invention, ornamental driftwood assembly 12 and ornamental foliage implement 30 can be semi-permanently or removably secured to any inner surface of the viewing tank 10. As shown in FIG. 1, driftwood assembly 12 is semi-permanently secured to a vertically extending inner surface 24 via engagement of suction cup 20 with the surface 24. Likewise, ornamental foliage implement 30 is shown to be semi-permanently attached to a lower horizontal surface 26 of viewing tank 10.

In application, the invention permits semi-permanent or removable engagement of the driftwood assembly 12 and the foliage implement 30 to any surface within the viewing tank without necessity of base weighting, gravel, sand or the like, which is typically required to avoid tipping or unintended floatation. The engagement of the suction cup 20 against the substantially planar surfaces produces a vacuum bond such that driftwood assembly 12 and foliage implement 30 can be semi-permanently attached to any such surface of viewing tank 10. Semi-permanent engagement will be maintained until the suction cups 20 and 38 of driftwood assembly 12 and foliage implement 30, respectively, are physically detached from the inner surface of viewing tank 10.

Figure 4:
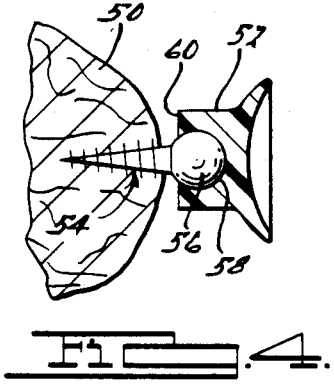
FIG. 4 is a partial cross-sectional view illustrating the omnic-positional characteristics of the present invention.

Another feature of the present invention is illustrated in FIG. 4. According to the preferred embodiment, body member 50, which can consist of either driftwood or artificial foliage, as previously defined, is permanently attached to suction member 52 via attachment means which preferably consist of a screw 54. Screw 54 has a spherical head member 56 which is retained within a similarly configured spherical cavity 58 provided on the second end 60 of suction member 52. Cavity 58 has a slightly larger diameter than that of head member 56 of screw 54 so as to permit omni-directional movement of suction member 52 relative to screw 54. When suction cup 62 is semi-permanently secured to any inner surface of viewing tank 10, body member 50 may be rotated and/or pivoted relative to suction member 52 without the need of detaching suction cup 62. This omni-directional characteristic is provided by the generally unrestricted pivotal and rotational movement capability of the spherical head member 56 moveably retained within cavity 58 of suction member 52.

It should be noted that the terms assembly, device, article and implement can be used interchangeably and are considered to define the combination of a decorative body member and suction member in accordance with the preferred embodiment of the present invention. Likewise, while the above description constitutes the preferred embodiment of the present invention, it will be appreciated that the invention is acceptable to modification, variation and change without departing from the proper scope and fair meaning of the accompanying claims.

I claim:

1. An ornamental device of use in a fluid-filled viewing tank, said ornamental device comprising:
   a decorative natural indiscriminate driftwood body member; and
   suction cup means for semi-permanently securing said decorative natural indiscriminate driftwood body member to an inner surface of said viewing tank so as to directly fixably locate said natural indiscriminate driftwood body member thereto, said securing means affixed to said decorative natural indiscriminate driftwood body member to form an integral body member which is adapted to be directly secured to the viewing tank.

2. An ornamental device according to claim 1 wherein said securing means removably secures said decorative body member to a vertically extending inner surface of said viewing tank.

3. An ornamental device according to claim 2 wherein said suction cup means having a first end defining a suction-producing surface for engagement with an inner surface of said viewing tank, and a second end defining means for permanently affixing said suction member to said decorative body member.

4. An ornamental device according to claim 3 wherein said suction cup means further comprises means for enabling omni-positional movement of said decorative body member relative to said suction member while said suction member is maintained in semi-permanent engagement with said inner surface of said viewing tank.

5. An ornamental device according to claim 1 wherein said ornamental device is positioned in an aquatic tank, said securing means removably fixably securing said assembly to said inner surface of said tank so that said securing means counteract the buoyant tendencies of liquid within said aquatic tank to prohibit unintended floatation.

6. A method of fixably and semi-permanently securing an ornamental device to an inner surface of a fluid-filled viewing tank comprising:
   providing an ornamental device having a decorative natural indiscriminate driftwood body member and a suction member, said suction member having a first end permanently affixed to said decorative natural indiscriminate driftwood body member and a second end configured as a suction cup;
   positioning said decorative natural indiscriminate driftwood body member within said viewing tank relative to a desired inner surface of said viewing tank; and
   engaging said suction cup of said suction member directly with said desired inner surface of said viewing tank, whereby said ornamental assembly is semi-permanently secured to said inner surface.

7. The method of claim 6 further comprising engaging a vertical inner surface of said viewing tank with said suction cup so that said suction cup semi-permanently and removably fixably secures said ornamental assembly to said vertical inner surface.

8. A method for enabling omni-positional orientation of an ornamental device fixably and semi-permanently secured to an inner surface of an aquatic viewing tank comprising:
   providing ornamental device having a decorative natural indiscriminate driftwood body member and a suction member, said suction member having a first end affixed to said decorative natural indiscriminate driftwood body member permitting omni-directional movement therebetween, and a second end configured as a suction cup;
   engaging said suction cup directly with an inner surface of said viewing tank so as to semi-permanently attach said ornamental device thereto; and
   moving said decorative natrual indiscriminate driftwood body member omni-directionally to a desired orientation without disengaging said suction cup from said surface of said viewing tank.

9. An ornamental device of use in a fluid-filled viewing tank, said ornamental device comprising:
a decorative artificial foliage body member; and
suction cup means for semi-permanently securing said decorative artificial foliage body member to an inner surface of said viewing tank so as to directly fixably locate said artificial foliage body member thereto, said securing means affixed to said decorative artificial foliage body member to form an integral body member which is adapted to be directly secured to the viewing tank.

* * * * *

UNITED STATES PATENT AND TRADEMARK OFFICE
CERTIFICATE OF CORRECTION

PATENT NO. : 4,974,545

DATED : December 4, 1990

INVENTOR(S) : Richard L. Jones

It is certified that error appears in the above-identified patent and that said Letters Patent is hereby corrected as shown below:

Column 1, line 17, delete "artifical" and insert --artificial--.

Column 1, line 36, delete "fo" and insert --of--.

Column 1, line 67, delete "drifwood" and insert --driftwood--.

Column 2, line 15, delete "persent" and insert --present--.

Column 2, line 23, delete "omnic-positional" and insert --omni-positional--.

Column 2, line 30, delete "contemptated" and insert --contemplated--.

Column 3, line 55, delete "acceptable" and insert --susceptible--.

Column 4, line 65, delete "natrual" and insert --natural--.

Signed and Sealed this

Fifteenth Day of September, 1992

*Attest:*

DOUGLAS B. COMER

*Attesting Officer*  *Acting Commissioner of Patents and Trademarks*